United States Patent Office 2,867,758
Patented Jan. 6, 1959

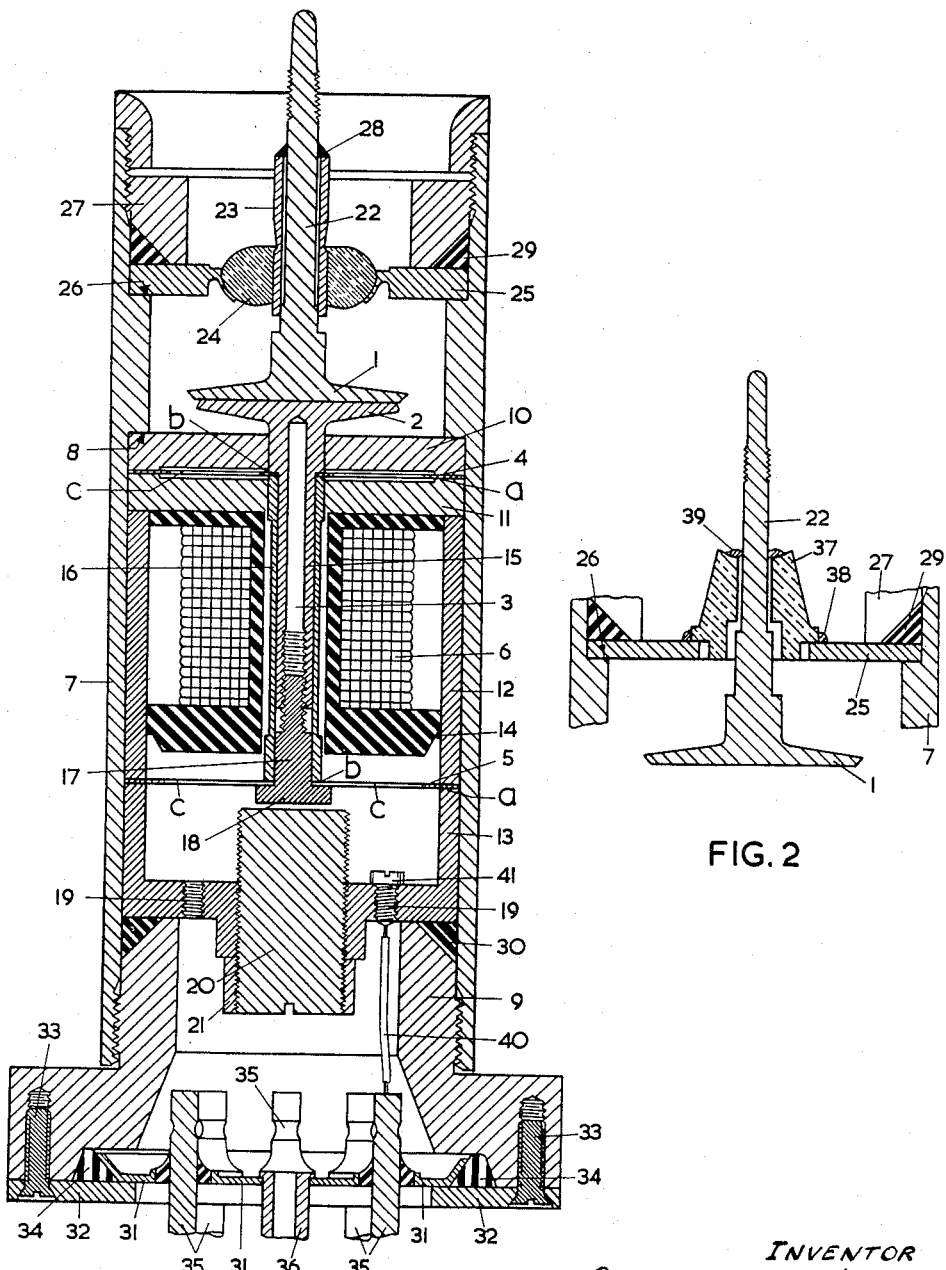

2,867,758

DEVICES COMPRISING ELECTRICAL CONDENSERS ADAPTED TO VARY THEIR CAPACITY PERIODICALLY

Graham Henry Wilstead, Richmond, England, assignor to Electronic Instruments Limited, Richmond, England, a British company Application December 22, 1954, Serial No. 476,958

Claims priority, application Great Britain December 22, 1953

4 Claims. (Cl. 317—250)

This invention relates to devices comprising an electrical condenser adapted to vary its capacity periodically. Such devices may be employed for converting an unknown direct voltage into alternating voltage, to enable said direct voltage to be measured with great accuracy.

The object of the invention is the provision of an improved device of this character. The invention consists broadly of an electrical condenser construction affording periodically varying capacity, comprising a sealed container, two condenser plates mounted in said sealed container, one of said condenser plates being freely supported by flexible means, whereby it is capable of moving towards and away from the other, and means for periodically reciprocating said one condenser plate towards and away from said other.

In order that the invention may be the more clearly understood, a device in accordance therewith will now be described, reference being made to the accompanying drawings wherein:

Figure 1 is a sectional elevation of said device.

Figure 2 is a sectional elevation of a possible modification of a portion of said device.

Referring first to Figure 1, the instrument comprises an upper fixed circular condenser plate 1 having its under surface horizontal and a lower reciprocable circular condenser plate 2 concentric with said upper plate and having its upper surface horizontal and close beneath the lower surface of said upper plate. The reciprocation of the lower plate 2 takes place in a vertical line, and, for enabling said lower plate to be so reciprocated, it has a vertical stem 3 extending downwards therefrom and supported by two spiders 4 and 5 which are in horizontal planes, one near the top and one near the bottom, each spider consisting of an integral piece of sheet metal formed with an outer ring $a$ which is clamped between fixed parts, a central hub $b$ which is clamped to said stem, and a plurality of spokes $c$ joining said outer ring to said hub.

For effecting the reciprocation of said lower plate 2, a coil 6 is provided coaxially surrounding said stem 3 between said upper and lower spiders 4 and 5, and alternating current is supplied to said coil.

Both plates 1 and 2 are contained in an atmosphere of inert gas, in a sealed container, which comprises a vertical cylindrical wall 7 of say steel concentric with said condenser plates. At the appropriate level this cylindrical wall is formed on its inner surface with a downwardly facing shoulder 8. A lower annular clamping member 9 screws into the bottom of said cylindrical wall 7, and, between said downwardly facing shoulder 8 and said clamping member 9 the following parts are clamped in the order from top to bottom: A circular upper clamping plate 10, the upper spider 4, a circular lower clamping plate 11, an upper sleeve-like spacer 12, the lower spider 5, and a lower sleeve-like spacer 13. The two clamping plates 10 and 11 and the two spacers 12 and 13 make close sliding fit within the cylindrical wall 7. The upper and lower clamping plates 10 and 11 clamp between them the outer ring $a$ of the upper spider 4, but their lower and upper surfaces respectively are formed with shallow recesses as clearly shown so that the remainder of said upper spider 4 is free to reciprocate up and down. Said upper and lower clamping plates 10 and 11 have central holes through which the stem 3 of the lower plate 2 passes with a small clearance. The upper clamping plate 10 is of course pressed hard up against the downwardly facing shoulder 8.

The sleeve-like spacers 12 and 13 clamp the outer ring $a$ of the lower spider 5 between them. The lower end of the lower spacer 13 is of course engaged and pressed upwards by the annular clamping member 9.

The alternating current winding 6 is carried by a former which makes a close sliding fit within the upper spacer 12. This former is secured to said upper spacer 12 by means of a suitable cement indicated at 14.

For securing the central hubs of the spiders to the stem 3 of the lower condenser plate 2, said stem is made up of three parts. First a main part 15 which extends down integrally from the lower condenser plate 2 and is reduced in diameter over the major portion of its length from its lower end whereby a downwardly facing shoulder is formed near its upper end as clearly shown; second a sleeve 16 which fits slidably over the reduced portion of said main part 15; and third a clamping part 17 which screws upwards into the lower end of said main part 15 and has a head 18 at its lower end. The hub $b$ of the upper spider 4 has a hole in it through which the reduced portion of the main part 15 passes, and said hub is clamped between said downwardly facing shoulder on said main part and the upper end of said sleeve 16.

The sleeve at its lower end extends beyond the lower end of said main part 15 and just above the head 18 said clamping part 17 has a cylindrical portion which makes a close sliding fit in the lower end of said sleeve 16 as clearly shown. The hub $b$ of the lower spider 5 has a hole in it which fits slidably this cylindrical portion of the clamping part 17, and said hub is clamped between the upper surface of the head 18 of said clamping part and the lower end of said sleeve 16. It will be seen that by the screwing up of said clamping part 17, the clamping of the hubs $b$ of both spiders 4 and 5 is effected. It is to be understood that the support of said plate 2 and its stem 3 by the spiders 4 and 5 is quite free, the stem not being guided in any way by the surrounding fixed parts.

The lower sleeve-like spacer 13 has its lower end closed except for small holes 19 to pass the conductors for the alternating current coil 6 and a central screwed hole in which screws a cylindrical adjusting block 20. The magnetic circuit may be traced up the stem 3 of the reciprocating plate 2 horizontally outwards through both clamping plates 10 and 11, downwards through both sleeve-like spacers 12 and 13 and the cylindrical wall 7, horizontally inwards through the bottom closure of the lower sleeve-like spacer 13, up through the cylindrical adjusting block 20 and across the air gap between said cylindrical adjusting block and said stem 3. By adjustably screwing said adjusting block 20—which is fitted with a lock nut 21—the last named air gap, and therefore the reluctance of the magnetic circuit can be adjusted.

The lower spider 5 is made of a non-magnetic material such as Phosphor-bronze so as not to form a shunt in the magnetic circuit, and it may be insulated from the stem 3, but the upper spider 4 may be made of magnetic material so as to form part of the magnetic circuit together with the upper and lower clamping plates 10 and 11.

For fixedly mounting the upper condenser plate 1, the same is formed with an integral vertical stem 22 extending upwards therefrom. Said stem passes through, and is secured to, a metal sleeve 23 which, in turn passes coaxially through, and is secured to, a block 24 of glass. Said block 24 forms a plug in a central hole in a horizontal metal supporting plate 25 of disc form which fits closely in the cylindrical wall 7 and rests on an upwardly facing shoulder 26 formed in said cylindrical wall. Finally an annular clamping screw 27 is screwed into the upper end of said cylindrical wall 7 so as to clamp said supporting plate 25 firmly down on to said upwardly facing shoulder 26.

The glass block 24 is secured both to the sleeve 23 and the supporting plate 25 by a glass-to-metal seal. There is a considerable clearance between said stem 22 and the metal bush 23 and the connection between said stem and said bush is effected by soldering 28 at the top of the latter.

It is necessary that the lower surface of the upper condenser plate 1 shall be very accurately parallel to the upper surface of the lower condenser plate 2, and that the distance apart of said surfaces shall be small and accurately determined. In point of fact this distance is made as small as possible consistently with no contact being made between said two surfaces when the lower plate is reciprocated.

The above described way of mounting said upper condenser plate 1 enables this correlation of said two surfaces to be obtained. Thus, the lower condenser plate 2 is first mounted as heretofore described. The supporting plate 25, ready secured to the sleeve 23 through the medium of the glass block 24 is clamped in position, the upper condenser plate 1 at this stage being supported by the lower condenser plate 2 with its stem 22 passing freely through the sleeve 23 without being soldered to it.

A spacing sheet of some thin material, such as cigarette paper, of appropriate thickness, has been previously laid on the upper surface of the lower condenser plate 2, and the upper condenser plate 1 is rested on said spacing sheet and correctly centred. The stem 22 of said upper condenser plate 1 is weighted to give the appropriate deflection to the spiders 4 and 5 in relation to the thickness of the spacing sheet, and then, while both condenser plates 1 and 2 and their associated parts are in a state of free suspension by the spiders 4 and 5 the stem of the upper condenser plate is soldered to the sleeve 23 at 28. When the solder is set the annular clamping screw 27 is unscrewed and the whole unit comprising the horizontal supporting plate 25, the glass block 24, the sleeve 23 and the upper condenser plate 1 is lifted clear, and the spacing sheet is removed. When said unit is again replaced (care being taken to return the supporting plate 25 to the same position as before) there will be a gap between the two condenser plates depending on the thickness of the spacing sheet and the load to which the upper stem 22 was subjected.

The two condenser plates 1 and 2 are made of stainless steel and their adjacent surfaces have a thin coating of gold deposited on them. Said condenser plates 1 and 2 are of some considerable thickness and their edges are bevelled as shown, with the bevel of the upper plate 1 facing downwards and outwards and the bevel of the lower plate 2 upwards and outwards. The gold coating is continued over the bevelled surfaces of said plates, and thus the nearest exposed steel surfaces of the two plates are relatively remote from each other and thus errors arising from the difference in contact potential of gold and steel are minimised. The edge formed by the bevel is radiused to prevent it from being sharp.

As before stated the adjacent surfaces of the condenser plates 1 and 2 are as close together as possible consistently with their not touching when the lower plate is reciprocated. Contact between said surfaces is impeded by the gas atmosphere between them, which constitutes a cushion when the lower plate is approaching the upper plate, and this enables the plates to be normally closer together than would otherwise be possible. Said two adjacent surfaces are made optically flat.

For sealing the container, an upper rubber O-ring 29 is provided which makes a seal between the container wall and the supporting plate 25. This O-ring 29 is engaged by an inclined surface on the under side of the annular clamping screw 27.

A similar O-ring 30 makes a seal between the under surface of the lower sleeve-like spacer 13 and the inner surface of the container wall 7, being held in place by the lower annular clamping member 9. This O-ring 30 prevents any leakage through the screw threads of the clamping member 9 and the cylindrical container wall 7. To complete the seal a bottom plate 31 is provided with seats on the bottom surface of said clamping member 9. This bottom plate 31 is held in place by means of an annular clamping plate 32 which is secured by screws 33 on the bottom of said clamping member 9 and overlaps the marginal portion of said bottom plate 31. A rubber O-ring 34 is provided in an enclosed annular clearance bounded by the circumferential periphery of the bottom plate 31, the upper surface of the clamping plate 32 and a surface of the clamping member 9.

As before stated, the conductors which supply the alternating current coil pass down through holes 19 in the bottom of the lower sleeve-like spacer 13. These go to the upper ends of plug contacts 35 which pass in sealed relation through the bottom plate 31 and project downwards therefrom. Another of the plug contacts 35 is connected to the lower condenser plate 2 by means of a conductor 40 extending between said plug contact 35 and a plug 41 screwed into another of the holes 19. From said plug 41 said connection to the lower condenser plate 2 is completed through the spacer 13 and the spider 5 and through the spacers 13, 12, the plate 11 and the spider 4. Said plug contact 35 thus forms one terminal of the condenser.

The stem of the fixed condenser plate projects up, through the sleeve 23 to a level above the top of the container wall and forms the other terminal of the condenser.

The evacuation and gas filling of the container may be effected through a metal tube 36 passing in sealed relation through the bottom plate 31.

In practice the bottom plate 31, together with the plug contacts 35 and the tube 36, is constituted by a standard thermionic valve fitting. This incidentally involves the number of plug contacts 35 being greater than is required for the present apparatus.

It will be appreciated that the whole assembly can be disassembled and reassembled, the container being always hermetically sealed when assembled.

Figure 2 illustrates a modified arrangement for supporting the upper condenser plate 1. This differs from the arrangement of Figure 1 in that a block 37 of ceramic material is employed instead of the glass block 24, said block 37 being soldered to the supporting plate 25 by means of solder 38, and being also soldered direct to the stem 22 by means of solder 39. To render the block 37 capable of being soldered, it must first be provided with a thin metal coating at the regions where it is to be soldered.

What is claimed is:

1. A vibratory capacitor for delivering a periodically varying capacitance, said capacitor comprising, in combination, a sealed generally cylindrical casing filled with an inert gas, two capacitor plates disposed in the casing transversely of the longitudinal axis thereof in closely adjacent parallel relationship, mounting means stationarily supporting one of said plates, vibrating means supporting the other plate for linearly reciprocating the same toward and away from said stationary plate, said mounting means including a stem transversely extending from the respective plate, a support ring and an insulating insert sealed to said ring and said stem for supporting the latter, said ring being sealed to the inner wall of the casing, said vibrating means including a stem made of magnetic material and transversely extending from said other plate, an upper and a lower diaphragm device centrally secured to axially spaced portions of the magnetic stem, at least the lower diaphragm device being made of non-magnetic material, a pair of clamping plates made of magnetic material engaging therebetween the periphery of said upper device and fitted in said casing, a pair of clamping sleeves made of magnetic material engaging therebetween the periphery of said lower device and fitted in said casing, pressure and sealing means engaging one of said sleeves for pressing said clamping plates and sleeves against a shoulder formed in the inner wall of the casing and sealed to the wall and exciting coil means disposed in the casing surrounding said magnetic stem but leaving clearance to permit reciprocation of the said stem upon energization of the coil means, and means for adjusting the amplitude of the oscillations of the magnetic stem of the vibrating means and the respective capacitor plate, said adjustment means including a control block made of magnetic material disposed in axial alignment with the respective end of said magnetic stem of the vibrating means spaced apart therefrom to define an air gap, mounting means made of magnetic material supporting said block axially displaceable to vary said air gap and extending from the sleeve engaged by said pressure and sealing means to form a magnetic circuit and including said block, said block mounting means, said clamping sleeves, said clamping plates, said magnetic stem and said air gap between the stem and the block, the width of said air gap controlling the reluctance of said magnetic circuit whereby the amplitude of the oscillations of the stem is adjustable by varying said air gap and terminal means for supplying current to said coil means, said terminal means including conductors extending through said block mounting means.

2. A construction according to claim 1, wherein each of said diaphragm devices comprises a spider having an outer ring secured to the surrounding casing, an inner hub secured to the respective stem and spokes extending between said outer ring and said inner hub.

3. A construction according to claim 1, wherein said mounting means for the stationary capacitor plate comprise as insulating insert a block of glass sealed in said support ring by a metal-to-glass seal, a sleeve passing through said block of glass and sealed therein by a metal-to-glass seal, the bore of said sleeve forming an opening for the stem of the stationary plate and having said stem soldered therein.

4. A construction according to claim 1, wherein said mounting means for the stationary capacitor plate comprise as insulating insert and a block of ceramic material soldered in said ring, said block of ceramic material having a central hole which forms an opening for the stem of the stationary plate and said stem being soldered in said central hole.

References Cited in the file of this patent

UNITED STATES PATENTS

| 1,930,523 | Landon | Oct. 17, 1933 |
| 2,318,359 | Bellows | May 4, 1943 |
| 2,464,716 | Piton | Mar. 15, 1949 |
| 2,483,981 | Palevsky | Oct. 4, 1949 |
| 2,632,791 | Side | Mar. 24, 1953 |

FOREIGN PATENTS

| 898,903 | France | July 17, 1944 |